(12) United States Patent
Celik

(10) Patent No.: US 6,535,230 B1
(45) Date of Patent: *Mar. 18, 2003

(54) GRAPHICAL USER INTERFACE PROVIDING CONSISTENT BEHAVIOR FOR THE DRAGGING AND DROPPING OF CONTENT OBJECTS

(75) Inventor: Tantek I. Celik, Cupertino, CA (US)

(73) Assignee: Apple Computer, Inc., Cupertino, CA (US)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 08/511,645

(22) Filed: Aug. 7, 1995

(51) Int. Cl.$^7$ .................................................. G09G 5/00
(52) U.S. Cl. ........................ 345/769; 345/772; 345/861
(58) Field of Search ................................ 395/326, 333, 395/334, 335, 336, 339, 340, 342, 346, 347, 348, 349, 350, 351, 352, 357

(56) References Cited

U.S. PATENT DOCUMENTS

| | | | | |
|---|---|---|---|---|
| 5,428,736 A | * | 6/1995 | Kahl et al. .................... | 395/339 |
| 5,530,865 A | * | 6/1996 | Owens et al. ................ | 395/700 |
| 5,544,302 A | * | 8/1996 | Nguyen ........................ | 395/326 |

OTHER PUBLICATIONS

R.E. Berry, *"The Designer's Model of the CUA Workplace"*, *IBM Systems Journal*, vol. 31, No. 3, 1992, pp. 429–458.

* cited by examiner

*Primary Examiner*—Ba Huynh
(74) *Attorney, Agent, or Firm*—Burns, Doane, Swecker & Mathis, L.L.P.

(57) ABSTRACT

A drag-and-drop operation in a graphical user interface is controlled dependence upon whether the destination for the operation is a content object or a service object. If the destination of a drag-and-drop operation is a content object, the resulting action is to move the dragged object from its original location to the destination. If the destination is a service object, the resulting action is to perform the associated service on the dragged object without affecting the perceived location of the data contained in the dragged object. If the user desires that an operation other than a move be made when dragging an object to a content object, a specified key on a keyboard is pressed, to indicate that the drag-and-drop operation should make a copy, rather than merely move the object. If the source of the dragged object does not permit the user to move the object, the user can be presented with an option to copy the object when the drag-and-drop operation is carried out. Alternatively, rather than requesting the user to indicate a choice each time such a situation occurs, the computer system can be set up to automatically make a copy if the source does not permit the object to be moved.

3 Claims, 4 Drawing Sheets

GRAPHICAL USER INTERFACE PROVIDING CONSISTENT BEHAVIOR FOR THE DRAGGING AND DROPPING OF CONTENT OBJECTS

FIELD OF THE INVENTION

The present invention is directed to graphical user interfaces that are employed in computer systems, such as personal computers, and more particularly to a graphical user interface that provides consistency of operation for the dragging and dropping of all types of objects.

BACKGROUND OF THE INVENTION

The evolution of the computer industry is unparalleled in its rate of growth and complexity. Personal computers, for example, which began as little more than calculators having limited memory, tape-driven input capabilities and monochrome displays are now able to handle almost any data processing task with relative ease. While the ever-growing increase in computing power provided greater capabilities for application programmers and end users alike, the corresponding increase in complexity created an ease of use problem. Consequently, computer system designers were faced with a new challenge, namely to harness the available computing power in a form that was usable even by those with relatively little computer training, to ease the transition of users into a computer-based information paradigm.

In pursuit of this objective, various input/output philosophies, such as "user friendly," "wysiwig" and "menu driven" became popular. These approaches to the input/output function are particularly applicable to microcomputers, also known as personal computers, which are intended to appeal to a broad audience of computer users, including those who had no previous computer experience. An important aspect of computers which employ those input/output concepts was, and continues to be, the interface which allows the user to input commands and data and receive results. One particularly prevalent form of interface is known as the graphical user interface (GUI).

One popular type of GUI display is based on a visual metaphor which defines a monitor screen as a work space known as a "desktop," in which the contents of documents are presented in relocatable regions known as "windows." In addition to windows, the graphical user interface typically includes icons that represent various objects in the computer system. In this context, the term "object" refers to any software entity that exists in the memory of the computer and constitutes a specimen of a particular class. For example, an object can be a data file which contains the contents of a document. It can also be an application program or other type of service provider, such as a hardware driver. An object can also be a container for other objects, such as a folder or a window.

One of the primary advantages offered by the graphical user interface, in terms of making the computer easier to use, is the ability for the user to effortlessly manipulate objects by moving, or otherwise acting upon, their icon representations. For example, a graphical user interface typically includes a cursor, or similar type of pointing device, that is controlled by the user to select objects. By actuating a button or key while the cursor is positioned over an icon, for example double-clicking a mouse button, the user can cause the object represented by the icon to open. If the icon represents an application program, the program can be launched. If the icon represents a data file, the application program which created that data file can be automatically launched, and the file opened within the program.

Another ease-of-use capability provided by the graphical user interface is known as "drag-and-drop." This term refers to the functionality which permits a user to select an icon, or other representation of an object, and "drag" the icon from one location to another on the display. For example, an icon for a data file can be dragged from the desktop to a folder, to cause the data file to be stored within the folder. In another type of drag-and-drop operation, an icon for a graphic document can be dragged into a window, to cause the document to be displayed within the window. As another example, an icon for a text document can be dragged onto an icon for a printer, to cause the document to be printed.

In the past, the result of a drag-and-drop operation was dependent upon a number of factors, such as the type of object being dragged, the type of source from which the object was being dragged, and the type of destination. In some instances, the location of the source and the location of the destination were also factors that influenced the resulting action. In this context, the term "type" refers to an inherent characteristic or property of each object. For example, an object can be a text type of object, i.e. a data file containing textual data, a graphic type of object, which is another form of data file containing graphical information, or an application type, namely an executable program. If an action that results from any given drag-and-drop operation is dependent upon the first three independent factors noted previously, all of the possible forms of action can be represented in a three-dimensional matrix of dimensions n×m×m, where n is the number of types of objects in a system (typically on the order of 100 or more) and m is the number of types of receiving, or container, objects onto which any given object can be dropped (which may be on the order of 10 or more). If additional factors are involved, the number of possible results increases exponentially.

A typical computer user cannot reasonably be expected to remember all of these possibilities. As such, the model for drag-and-drop operations is not intuitive. Consequently, when a user performs a particular drag-and-drop operation, the resulting action may not be what was expected, or desired. For example, a user may know that the dragging of an icon from a desktop to a folder on the desktop results in the file represented by the icon being moved into that folder. However, if an icon is dragged from a window representing a removable disk to the desktop folder, the resulting action may be to make a copy of the file represented by the icon, while retaining the original version on the removable disk. The user may have intended merely to move the file from the removable disk to the desktop folder, similar to moving the icon from the desktop to the folder. Because there are two copies of the file, the user is required to go back to the removable disk and delete the original copy of the file therefrom. The need for the user to perform these extra actions, because the result of the drag-and-drop operation was not as intended, is counterproductive to the basic premise which underlies the graphical user interface, namely ease of use.

Accordingly, it is an objective of the present invention to provide a graphical user interface which ensures consistency of operation when objects are dragged to various destinations in windows and workspaces.

SUMMARY OF THE INVENTION

In accordance with the present invention, this objective is achieved by controlling the action of a drag-and-drop operation in dependence upon a single factor, namely whether the destination for the operation is a content object or a service object. Generally speaking, a content object is any type of object that has the capability to contain another object without manipulating its data. In contrast, a service object is one which provides a computational result on data when another object is dropped on it. If the destination of a drag-and-drop operation is a content object, the resulting action is to move the dragged object from its original location to the destination. If the destination is a service object, the resulting action is to perform the associated service on the dragged object without affecting the perceived location of the data contained in the dragged object.

If the user desires that a copy of an object be made when dragging it to a content object, rather than moving the object, such intention can be indicated through an appropriate action during the drag-and-drop operation. For example, the user may press a specified key on a keyboard, to indicate that the drag-and-drop operation should make a copy, rather than merely move the object. If the source of the dragged object does not permit the user to move the object, for example it is a locked disk, the user can be presented with an option to copy the object when the drag-and-drop operation is carried out. Alternatively, rather than requesting the user to indicate a choice each time such a situation occurs, the computer system can be set up to automatically make a copy if the source does not permit the object to be moved therefrom.

Further features of the invention, and the advantages offered thereby, are explained in detail hereinafter with reference to preferred embodiments illustrated in the accompanying drawings.

DETAILED DESCRIPTION

To facilitate an understanding of the present invention, its underlying principles are described hereinafter with reference to their implementation in a specific embodiment. In particular, certain references are made to features and terminology associated with the Macintosh® Operating System provided by Apple Computer, Inc. It will be apparent, however, that the practical applications of the present invention are not limited to this particular embodiment. Rather, it can be utilized in any type of computer system that provides a drag-and-drop type of operation that permits users to easily manipulate objects within the system.

Figure 1:
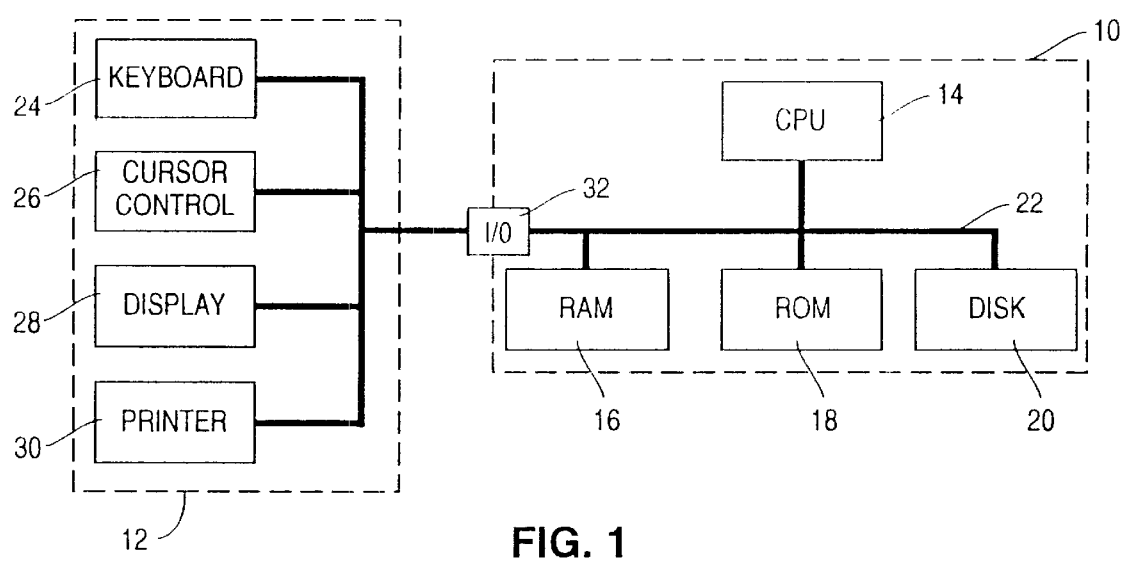
FIG. 1 is a general block diagram of an exemplary computer system of the type in which the present invention can be implemented.

While the particular hardware components of a computer system do not form part of the invention itself, they are briefly described herein to provide a thorough understanding of the manner in which the features of the invention cooperate with various components of a computer system, to produce the desired results. Referring to FIG. 1, a typical computer system includes a computer 10 having a variety of external peripheral devices 12 connected thereto. The computer 10 includes a central processing unit 14 and associated memory. This memory generally includes a main memory which is typically implemented in the form of a random access memory 16, a nonvolatile memory that can comprise a read only memory 18, and a permanent storage device, such as a magnetic or optical disk 20. The CPU 14 communicates with each of these forms of memory through an internal bus 22. The peripheral devices 12 include a data entry device such as a keyboard 24, and a pointing or cursor control device 26 such as a mouse, trackball, pen or the like. A display device 28, such a CRT monitor or an LCD screen, provides a visual display of the information that is being processed within the computer, for example, the contents of a document being created by the user. A hard copy of this information can be provided through a printer 30, or similar such device. Each of these external peripheral devices communicates with the CPU 14 by means of one or more input/output ports 32 on the computer.

Figure 2A:
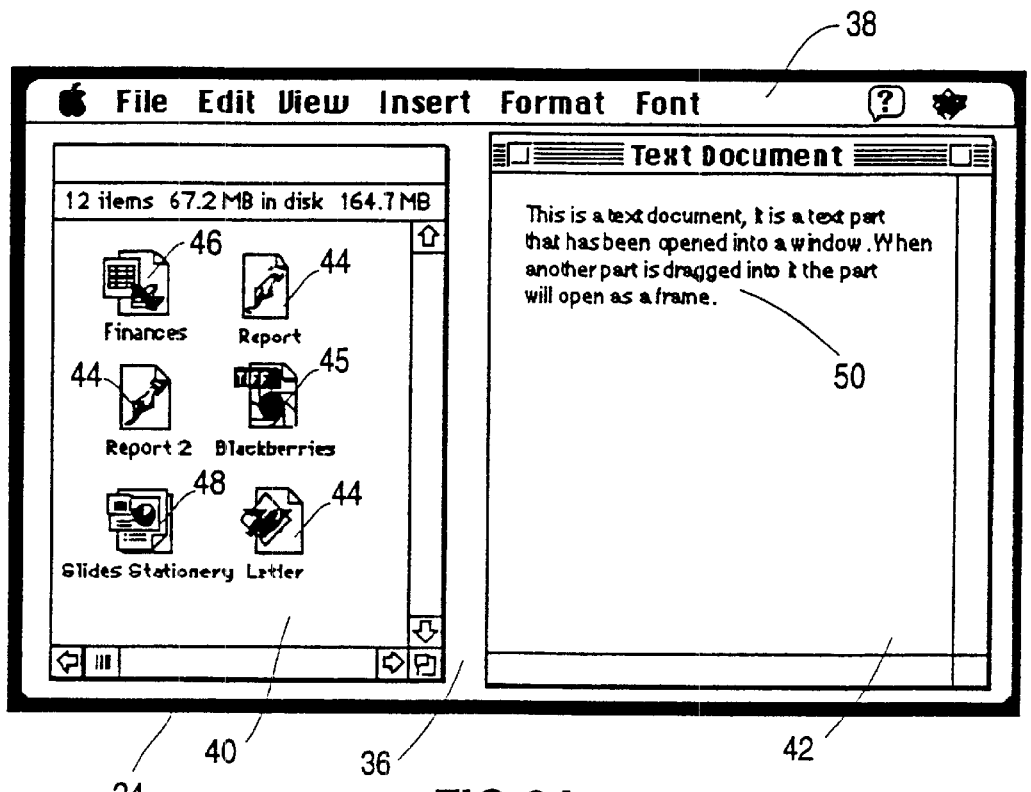
FIGS. 2A and 2B are illustrations of a desktop in a graphical user interface.
Figure 2B:
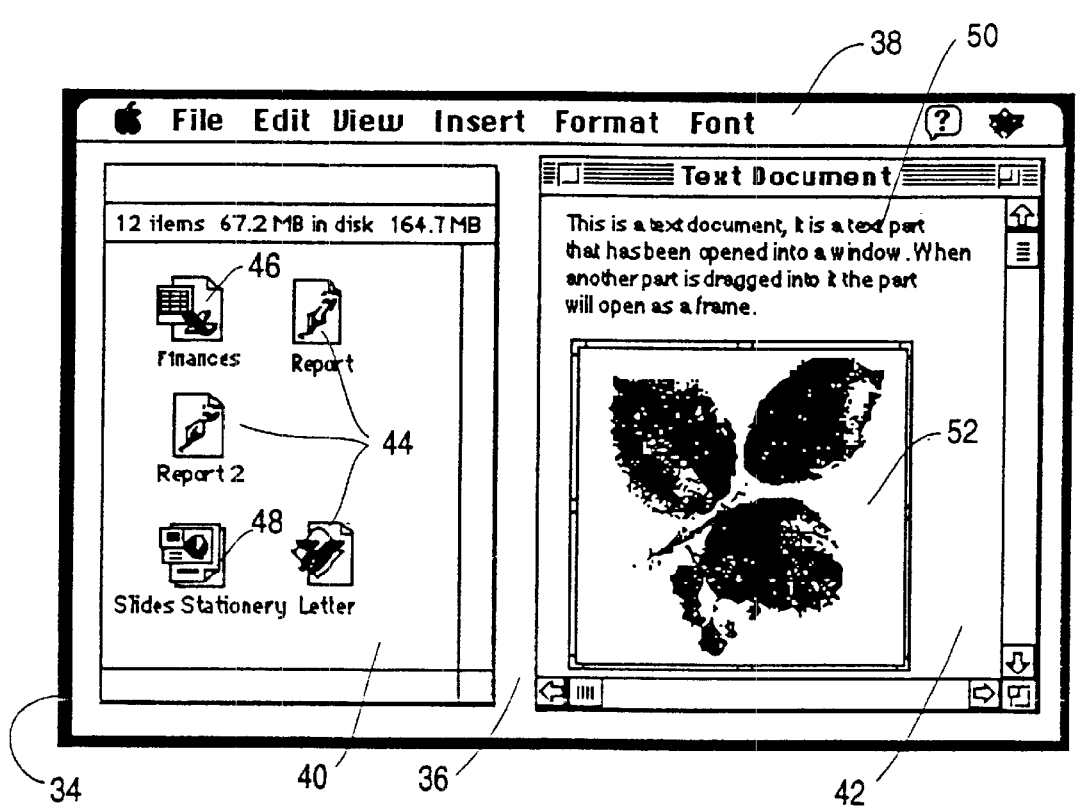

The present invention is particularly directed to a system which controls the manner in which the CPU 14 handles information that is manipulated by the keyboard 24 and the cursor control device 26, as well as the manner in which that manipulated information is portrayed to the user through the display device 30. An example of an interface which employs the principles of the present invention is illustrated in FIGS. 2A and 2B. These figures illustrate a desktop 34 which defines a workspace 36. Also included on the desktop is a menu bar 38. Within the workspace 36 are two windows, 40 and 42. The left-hand window 40 is a folder window which contains icons representing various objects. As shown in FIG. 2A, three icons 44 pertain to text objects, a fourth icon 45 represents a graphic object and another icon 46 represents a spreadsheet object. A sixth icon 48 is a stationary icon representing an object that can be used for the creation of presentation slides. In FIG. 2A the right-hand window 42 contains a document which includes text 50.

FIG. 2B illustrates the result of an operation in which the graphic icon 45 has been dragged from the folder in the left window 40 to the text document in the right window 42. As is known in interfaces which provide a desktop metaphor, such as that shown in FIGS. 2A and 2B, dragging is an operation in which objects can be moved or copied on the desktop and within windows through the actuation of the cursor control device 26. When the graphic icon is placed within the document, its contents can be displayed, as illustrated in FIG. 2B.

Figure 3A:
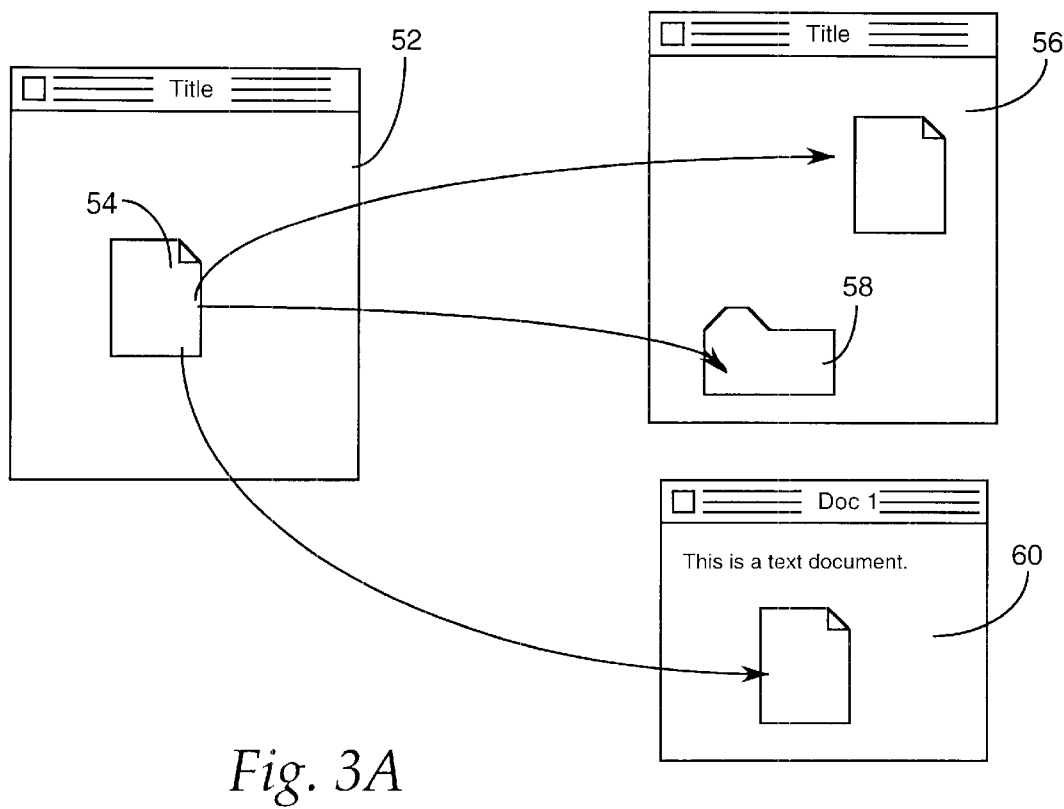
FIGS. 3A and 3B are illustrations of different types of drag and drop operations.

Generally speaking, an object can be dragged to a variety of different types of destinations. FIG. 3A illustrates some examples of different types of container objects that can serve as destinations for a drag-and-drop operation. Referring thereto, a window 52 contains a file 54 which the user has selected with a cursor. This file can be dragged to another window 56 on the desktop. Alternatively, it can be dragged to a folder 58, which could reside within a window or on the desktop itself. As a third alternative, the file 54 can be dragged into a text document 60 which might be displayed in another window. Each of the objects to which the file 54 is moved in the examples of FIG. 3A, namely the window 56, the folder 58 and the document 60, is a "container" object. These objects have the ability to embed objects within their contents. For example, when an object contains another object, it may include a pointer or other analogous type of reference to the location of the embedded object in the computer's memory.

In a preferred implementation, the present invention is incorporated in a component-software based user interface of the type disclosed in U.S. patent application Ser. No. 08/175,549, filed Dec. 30, 1993. In this type of user interface, objects exist in the form of parts, where each part consists of intrinsic contents and an associated editor or handler. One of the fundamental properties of parts is that any part can function as a container for any other part, or be contained within any other part. Thus, any part can be dragged and dropped onto any other part, and become a portion of the contents of the receiving part.

Figure 3B:
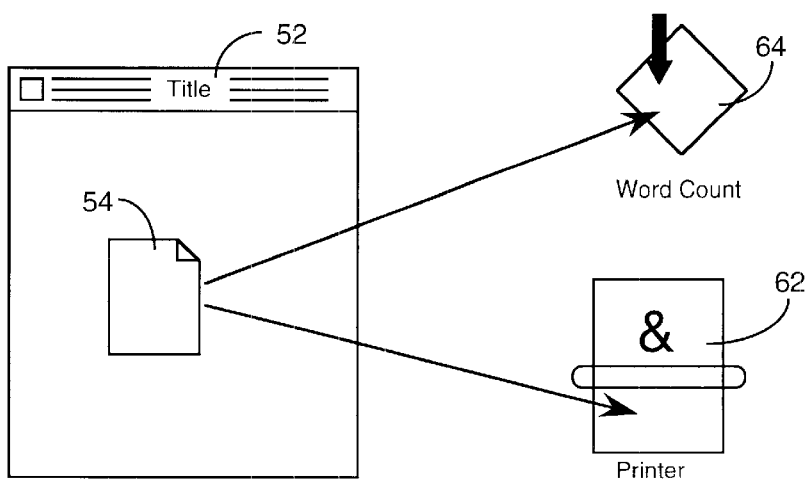

In addition to container objects, a given object can also be dragged to a service object. Referring to FIG. 3B, the file 54 can be dragged onto an icon 62 which represents a printer. As an alternative, the file 54 can be dragged onto an icon 64 that represents a word count service. When the file is dropped onto the printer icon 62, it causes the contents of the file to be printed at a particular printer associated with the icon. When it is dropped on the word count service icon 64, an application is launched which counts the number of words in the file, and reports the results of the count to the user. Whenever either of these services is performed, the dropped object remains intact, i.e. it is not consumed by the service. Consequently, the icon 54 returns to its original state, within the window 52, after the user has dropped it onto one of the service icons 62 or 64.

In accordance with the present invention, the user interface provides a consistent form of action whenever the user carries out a drag-and-drop operation. The specific action that is performed is determined by the destination for the dragged object. If the destination is a container object, such as any of the examples illustrated in FIG. 3A, the dragged object is moved from its original location to the destination object. Alternatively, if the destination object is a service provider, as illustrated in FIG. 3B, the associated service is carried out with respect to the dragged object, but the perceived location of the object does not change. In other words, in the example of FIG. 3B, the icon 54 returns to its original location in the window 52. With this approach, the user is not required to remember a number of different types of actions that could result from a drag-and-drop operation. Rather, only two different actions are normally provided, namely moving the object or performing a service, and are determined solely by the nature of the destination object.

Of course, there may be instances when the user desires to place a copy of a selected object at the destination, and leave the original version of the object intact, rather than move it. For example, referring to FIG. 3A, the user may desire to place a copy of the file 54 in the folder 58. In this situation, the user can indicate the desire to make a copy by performing a specified action during the drag-and-drop operation. For example, the user can press a particular key on the computer keyboard, such as a shift or control key, while carrying out the drag-and-drop operation. As another example, if the cursor control device is a mouse, or the like, which has two or more buttons, one of the buttons can be designated as the "primary" button which is employed for default operations, such as selecting files and dragging icons, and one of the other buttons can be designated as a modifier button which indicates alternative operations, such as copying rather than moving an object.

If desired, the user interface can also provide a visual distinction between moving and copying operations. For example, during a normal drag-and-drop operation to a container object, the representation of the icon can move on the display with the cursor during the dragging operation. However, when a copying action is indicated, the image of the icon can remain in its original location, and a "ghost" or outline image of the icon can follow the cursor, to indicate that the original object is remaining intact.

In addition to copying, other types of modified actions may be desirable in response to a drag-and-drop operation. For example, the user may wish to create a ink between two objects, or create a reference object which refers to the original object, e.g., an alias. In such a case, other modifier keys can be designated for these other types of actions.

In some cases, it may not be possible for the user to move an object from the source location as part of the drag-and-drop operation. For example, if a folder or disk which contains the object has been locked, the user does not normally have the option to make changes to the object. Rather, the user's capabilities may be limited to reading the object. In such a case, if the user attempts to perform a drag-and-drop operation with respect to a locked object, a warning can be displayed, to indicate that the user does not have the necessary authority to move the object. As part of the warning, the user can be provided with the option to make a copy of the object, instead of moving it. In this case, the original version of the object remains intact, so that its write-access privilege is not violated, but the user can still place a copy of the object at a desired new destination.

As an alternative to providing the user with an option to copy the dragged object, the user can set a system preference which automatically carries out a desired operation whenever an object cannot be moved through a drag-and-drop operation. For example, the user may set a parameter in the system which causes it to automatically copy the dragged object, or to automatically cancel the move when the user drags an object from a non-changeable source.

Figure 4:
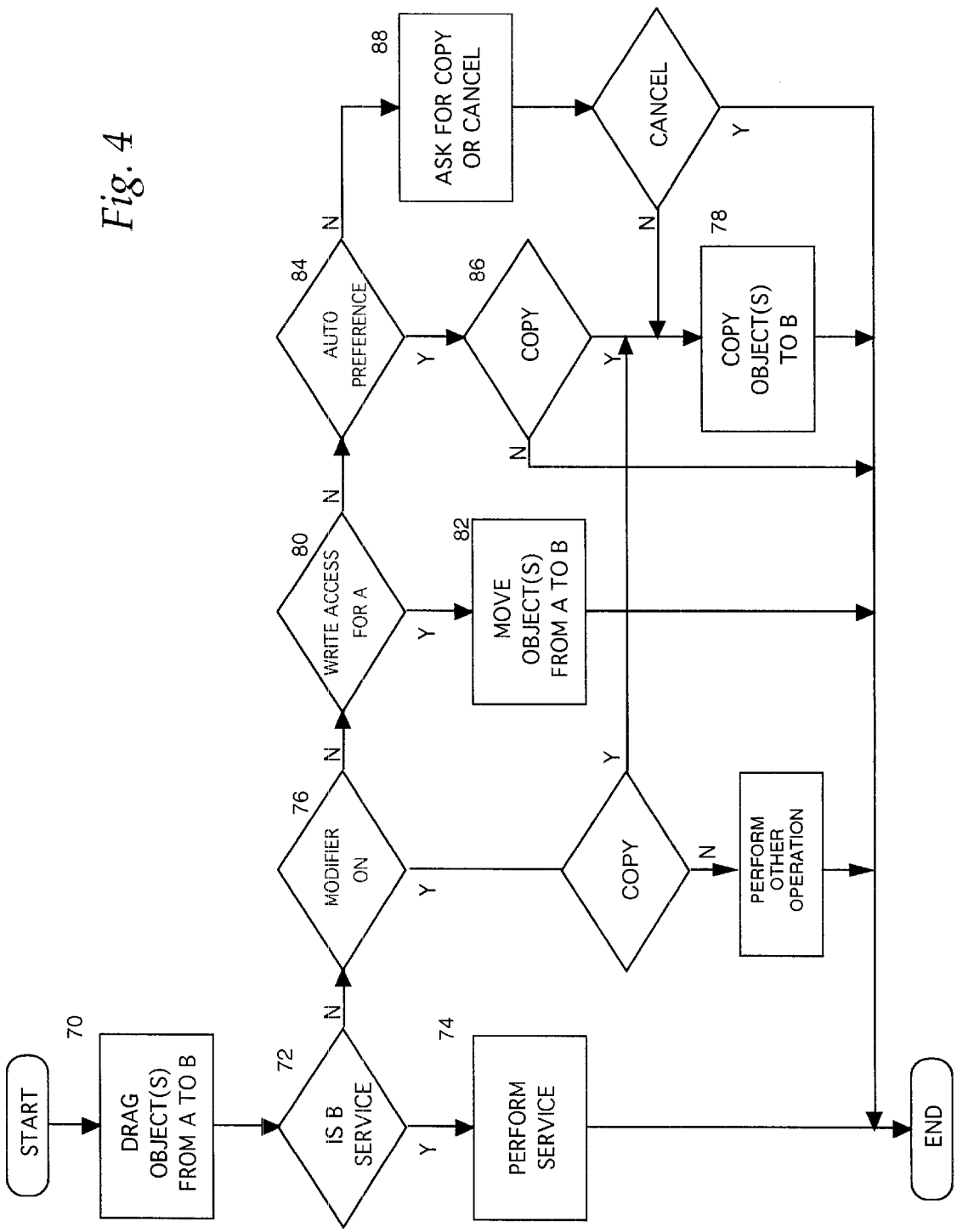
FIG. 4 is a flowchart of the operation of a user interface in accordance with the present invention.

The foregoing functionality of the graphical user interface is illustrated in the flow chart of FIG. 4. Referring thereto, at step 70 a user drags one or more objects from a source location A to a destination object B. A step 72 at determination is made whether the destination object B is a service. If so, the service is performed on the dragged object(s) at step 74, and the process ends.

If the destination is not a service, a determination is made at step 76 whether the user has pressed a modifier key or button. If so, the appropriate modified action is carried out, e.g., a copy of the object is made and stored in the destination object B, at step 78. Otherwise, a determination is made at step 80 whether the user has write access for the source location A, i.e. whether the user is permitted to move the object from its current location. If so, the object is moved from its source location A to the destination object B, at step 82 e.g. a pointer which refers to the object is created in the destination object B and removed from the source object A. In addition, the image of the dragged object's icon is moved to the destination.

If a determination is made at step 80 that the user does not have write access for the source location A, an inquiry is made at step 84 whether a system preference has been established for read-only sources. If so, a determination of that preference is made at step 86. If the user has indicated that the object should be automatically copied, this action is carried out at step 78. Otherwise, the move is cancelled and the process ends. If the user has not indicated a specific preference, a dialog box can be displayed at step 88, asking the user whether he desires to copy the dragged object or cancel the move operation. If the user indicates cancel, the process ends. Otherwise, the object is copied at step 78, and the process then ends.

From the foregoing, it can be seen that the present invention provides a consistent action in response to a drag-and-drop operation, thereby enhancing the ease of use of the graphical user interface. The dragging action is independent of both the source of the object being dragged and the type of object being dragged. The resulting action is a binary decision that is based exclusively on whether the destination is a service object or a container object, thereby reducing the knowledge that is required of the user to successfully manipulate objects.

It will be appreciated by those of ordinary skill in the art that the present invention can be embodied in other specific forms without departing from the spirit or essential characteristics thereof. The presently disclosed embodiments are considered in all respects to be illustrative, and not restrictive. The scope of the invention is indicated by the appended claims rather than the foregoing description, and all changes that come within the meaning and range of equivalents thereof are intended to be embraced therein.

What is claimed is:

1. A method for manipulating objects in a graphical user interfaces for a computer, of the type in which representations of objects stored in a memory are displayed to a user on a display, comprising the steps of:

selecting a first object whose representation is displayed on said display;

dragging the representation of the first object from a first location on the display to a second location associated with a second object;

determining whether said second object is either a service object or a container object;

performing a service with respect to said first object if said second object is a service object;

detecting whether access to said first object is limited;

moving the representation of the first object from said first location to a new location associated with said second object if said second object is a container object, regardless of a source of the first object if access to said first object is not limited; and prohibiting the representation of the first object to said new location if access to said first object is limited.

2. The method of claim 1 further including the step of:

displaying a message which permits a user to indicate an alternative action for the first object if access to said first object is limited.

3. The method of claim 2, wherein said alternative action includes copying said first object to said second object.

* * * * *